United States Patent
Turnau et al.

(10) Patent No.: US 11,118,694 B2
(45) Date of Patent: Sep. 14, 2021

(54) MULTIPLE OUTLET VALVE ASSEMBLY

(71) Applicant: BrassCraft Manufacturing Company, Novi, MI (US)

(72) Inventors: William F. Turnau, Canton, MI (US); Joseph P. Schutte, Ann Arbor, MI (US)

(73) Assignee: BrassCraft Manufacturing Company, Novi, MI (US)

( * ) Notice: Subject to any disclaimer, the term of this patent is extended or adjusted under 35 U.S.C. 154(b) by 0 days.

(21) Appl. No.: 16/777,289

(22) Filed: Jan. 30, 2020

(65) Prior Publication Data

US 2021/0239225 A1 Aug. 5, 2021

(51) Int. Cl.
*F16K 11/087* (2006.01)
*F16K 31/60* (2006.01)
*F16K 25/00* (2006.01)

(52) U.S. Cl.
CPC ........ *F16K 11/0873* (2013.01); *F16K 25/005* (2013.01); *F16K 31/60* (2013.01)

(58) Field of Classification Search
CPC ............. F16K 11/0873; F16K 11/0876; F16K 11/0856; F16K 11/0836; F16K 37/0008; F16K 37/0016; F16K 37/00; F16K 35/027; F16K 35/025; F16K 35/04
See application file for complete search history.

(56) References Cited

U.S. PATENT DOCUMENTS

| | | | |
|---|---|---|---|
| 3,648,970 | A | 3/1972 | Hartmann et al. |
| 3,938,553 | A | 2/1976 | Ortega |
| 4,470,429 | A | 9/1984 | Johnson |
| 4,609,177 | A | 9/1986 | Turner et al. |
| 5,832,959 | A | 11/1998 | Szymczakowski et al. |
| 5,988,220 | A | 11/1999 | Sakaki |
| 6,497,250 | B1 | 12/2002 | Johann |
| 7,731,153 | B2 | 6/2010 | Miklo et al. |
| 8,584,701 | B2 | 11/2013 | Duncan |
| 8,740,180 | B2 | 6/2014 | Matsushita et al. |
| 8,910,662 | B2 | 12/2014 | Tan et al. |
| 9,810,338 | B2 | 11/2017 | Carter |
| 2004/0045613 | A1 | 3/2004 | Hinojosa, Jr. et al. |
| 2007/0068584 | A1* | 3/2007 | Murdock ............ F16K 11/0873 137/625.47 |
| 2016/0033050 | A1 | 2/2016 | Ferrer Beltran |
| 2019/0024907 | A1* | 1/2019 | Bath ................... F24D 19/1027 |
| 2019/0078692 | A1* | 3/2019 | Bonomi ............. F16K 11/0873 |

FOREIGN PATENT DOCUMENTS

| | | |
|---|---|---|
| EP | 2 365 237 | 9/2011 |
| KR | 20170091846 | 8/2017 |

\* cited by examiner

*Primary Examiner* — Michael R Reid
(74) *Attorney, Agent, or Firm* — Bose McKinney & Evans LLP

(57) ABSTRACT

An illustrative dual outlet, single inlet, and single handle valve assembly is disclosed that allows a user to manipulate the handle to selectively allow or inhibit fluid flow from the single inlet to multiple fluid delivery devices. The valve assembly includes an indexing device to permit the user to choose between a variety of configurations that directs flow to a single fluid delivery device, multiple fluid delivery devices, or no fluid delivery devices.

18 Claims, 8 Drawing Sheets

MULTIPLE OUTLET VALVE ASSEMBLY

BACKGROUND AND SUMMARY

The present disclosure relates to a valve assembly for supplying water to a fluid device, such as a bathroom or kitchen plumbing fixture. Specifically, the present disclosure relates to a valve assembly including multiple outlets and a single inlet that can be manipulated with a single handle to control the flow of water.

It is often desired to control the flow of water to multiple devices from a single source. Conventional valve assemblies allow for control of water flow to multiple devices with a single handle, but limit selective control of water flow to individual devices. In many markets, building codes require each terminal device to have their own independent control, preventing use of these known products. Furthermore, more control over water flow between multiple devices is desired to prohibit unnecessary flow to increase efficiency.

An illustrative dual outlet, single inlet, and single handle valve assembly is disclosed that allows a user to manipulate a single handle to selectively allow or inhibit water flow from a single inlet to multiple fluid delivery devices. The illustrative valve assembly includes an indexing device to permit the user to select between a variety of configurations for directing flow to a single fluid delivery device, multiple fluid delivery devices, or no fluid delivery devices.

According to an illustrative embodiment of the present disclosure, a valve assembly includes a valve body having an inlet, a first outlet and a second outlet. A handle is supported by the valve body, and a valve member is positioned within the valve body and is coupled to the handle. The valve member includes an inlet aperture in fluid communication with the inlet of the valve body and at least one outlet aperture in selective communication with at least one of the first outlet and the second outlet of the valve body. A valve stem is operably coupled to the handle and the valve member. The valve body further includes a handle hub having an aperture for receiving the valve stem and a plurality of circumferentially spaced notches. The handle includes a receiver to receive an end portion of the handle stem and a handle insert configured to couple with the receiver. The handle insert includes an indexing member configured to selectively engage with each of the plurality of circumferentially spaced notches.

According to another illustrative embodiment of the present disclosure, a valve assembly includes a valve body having an inlet, a first outlet and a second outlet. A handle is rotatably coupled to the valve body, and a valve ball is positioned within the valve body and is coupled to the handle. The valve ball includes an inlet aperture in fluid communication with the inlet of the valve body, a first outlet aperture in selective communication with the first outlet and the second outlet of the valve body, and a second outlet aperture in selective communication with the first outlet and the second outlet of the valve body. The valve ball selectively defines a plurality of configurations. A first configuration is defined when the first outlet aperture and the second outlet aperture of the valve ball are blocked from fluid communication with the first outlet and the second outlet of the valve body. A second configuration is defined when the second outlet aperture of the valve ball is in fluid communication with the first outlet of the valve body, and the first outlet aperture of the valve ball is blocked from fluid communication with the first outlet and the second outlet of the valve body. A third configuration is defined when the first outlet aperture of the valve ball is in fluid communication with the first outlet of the valve body, and the second outlet aperture of the valve ball is in fluid communication with the second outlet of the valve body. A fourth configuration is defined when the second outlet aperture of the valve ball is blocked from fluid communication with the first outlet and the second outlet of the valve body, and the first outlet aperture of the valve ball is in fluid communication with the second outlet of the valve body.

According to a further illustrative embodiment of the present disclosure, a valve assembly includes a valve body having an inlet, a first outlet and a second outlet. The valve body further includes a handle hub having an aperture and a plurality of notches. A valve member is positioned within the valve body. The valve member includes an inlet aperture in fluid communication with the inlet of the valve body, and at least one outlet aperture in selective communication with at least one of the first outlet and the second outlet of the valve body. A valve stem is operably coupled to the valve member. A handle is operably coupled to the valve stem. The handle includes a receiver to receive an end portion of the valve stem and a handle insert configured to couple with the receiver. The handle insert includes an indexing member configured to selectively match with each of the plurality of notches, the plurality of notches including a first notch, a second notch, a third notch and a fourth notch. The valve member selectively includes four operable configurations. A first configuration is defined when the inlet is blocked from fluid communication with the first outlet and the second outlet of the valve body, and the indexing member engages with the first notch. A second configuration is defined when the inlet is in fluid communication with the first outlet of the valve body, the inlet is blocked from fluid communication with the second outlet of the valve body, and the indexing member engages with the second notch. A third configuration is defined when the inlet is in fluid communication with both the first outlet and the second outlet of the valve body, and the indexing member engages with the third notch. A fourth configuration is defined when the inlet is blocked from fluid communication with the first outlet, the inlet is in fluid communication with the second outlet of the valve body, and the indexing member engages with the fourth notch.

Additional features and advantages of the present disclosure will become apparent to those skilled in the art upon consideration of the following detailed description of the illustrative embodiments exemplifying the disclosure as presently perceived.

BRIEF DESCRIPTION OF THE DRAWINGS

The detailed description of the drawings particularly refers to the accompanying figures in which.

Figure 1:
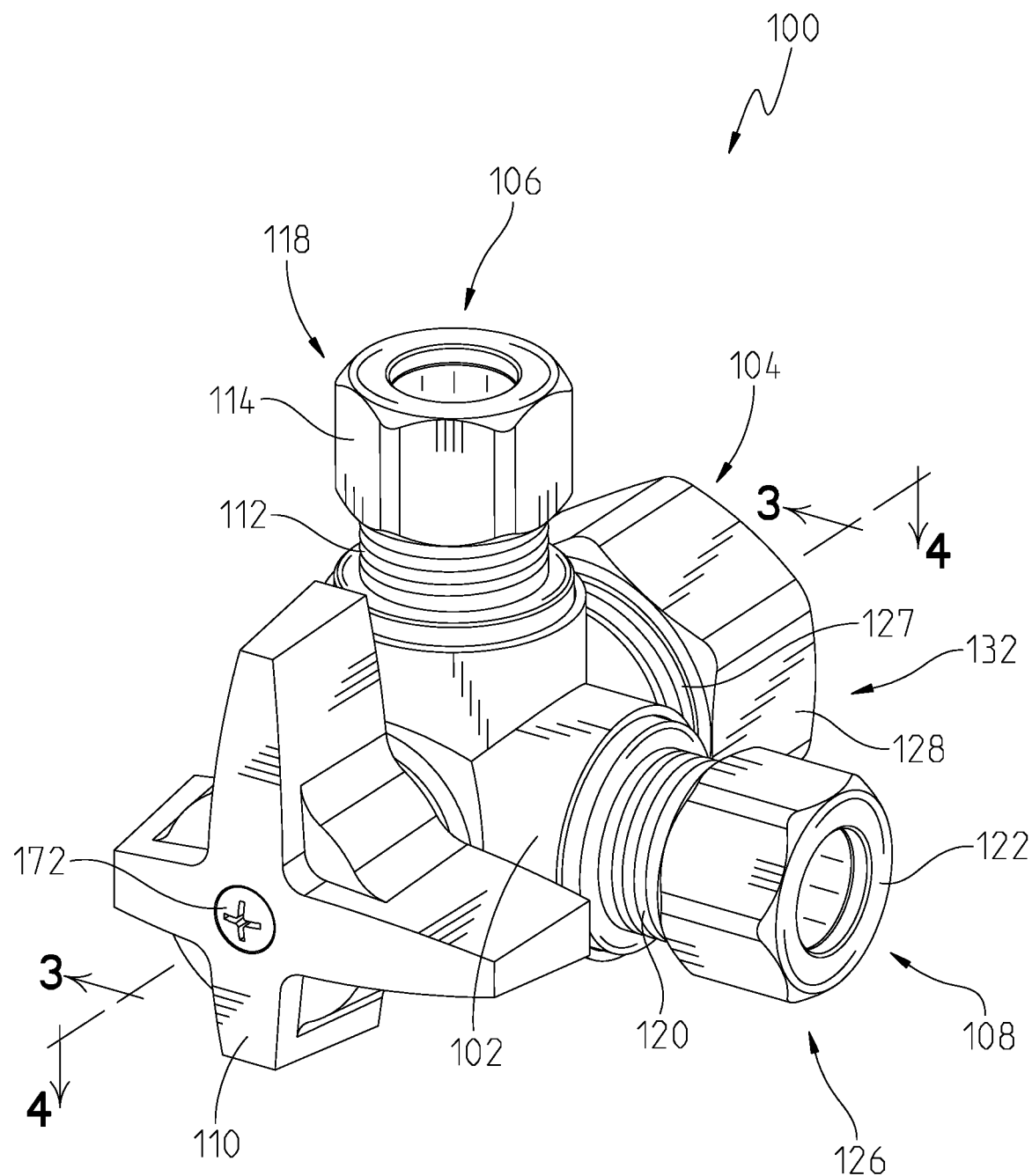
FIG. 1 is a perspective view of an exemplary valve assembly of the present disclosure, the valve assembly including two outlets, an inlet, and a handle.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION

The embodiments of the disclosure described herein are not intended to be exhaustive or to limit the disclosure to the precise forms disclosed. Rather, the embodiments described herein enable one skilled in the art to practice the disclosure.

Figure 2:
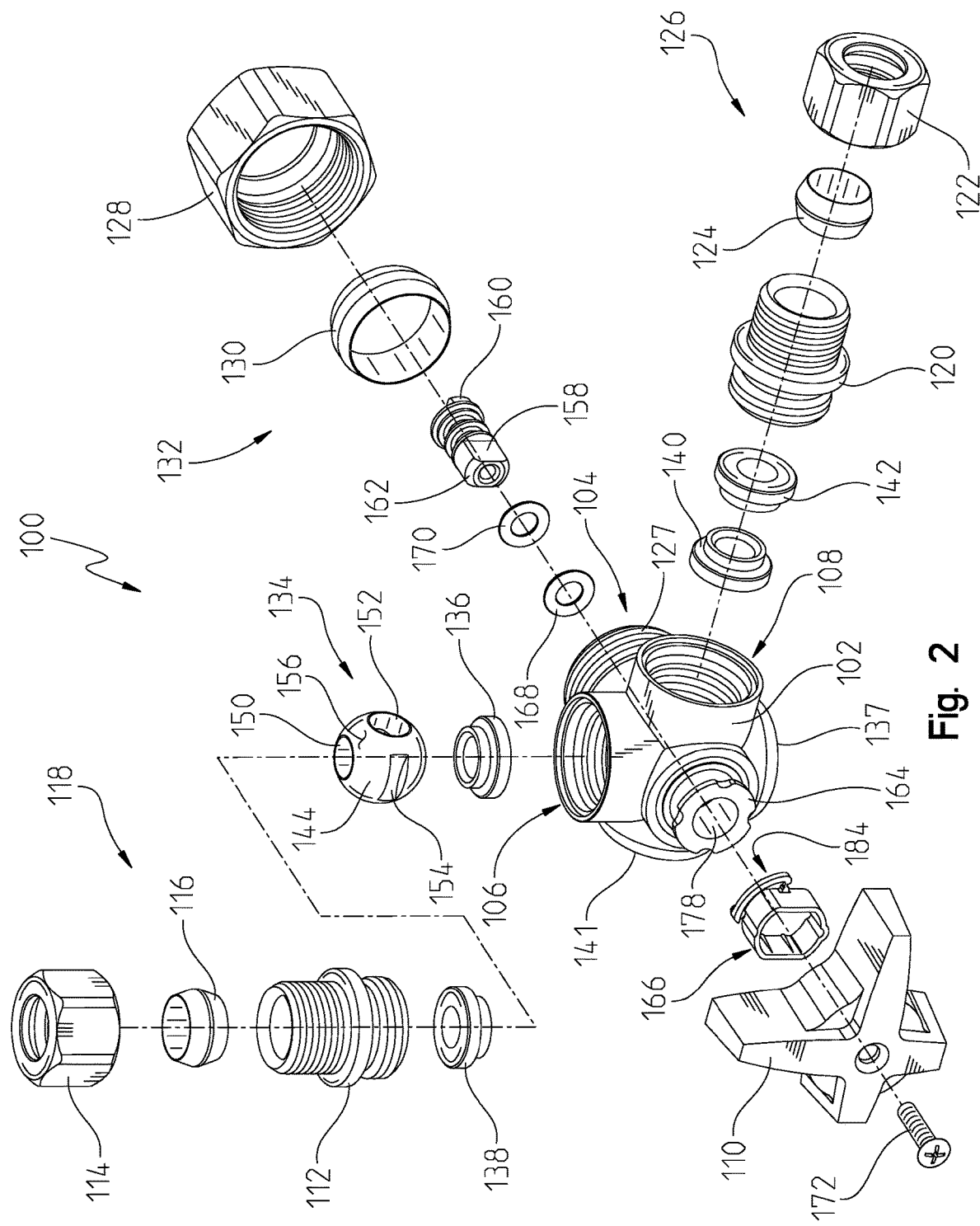
FIG. 2 is an exploded perspective view of the exemplary valve assembly of FIG. 1, including a valve ball received within a valve body that is configured to rotate within the valve body upon manipulation by a user via the handle.

Referring initially to FIGS. 1 and 2, a valve assembly 100 is disclosed. The valve assembly 100 includes a valve body 102 having an inlet 104, a first outlet 106, and a second outlet 108. In the illustrative embodiment, the first outlet 106 and the second outlet 108 are oriented approximately 90° from each other. In other embodiments, the first outlet 106 and the second outlet 108 may be oriented in other configurations. A handle 110 is illustratively supported by the valve body 102 in a manner that permits relative rotation of the handle 110. The inlet 104 is fluidly coupled to a fluid source, such as a water source (not shown) for supplying a water delivery device, such as a kitchen or bathroom plumbing fixture. As described further herein, depending upon the position or configuration of the valve assembly 100, fluid from the fluid source may flow into the inlet 104 and selectively flow through the first outlet 106, the second outlet 108, both outlets 106, 108, or neither of the outlets 106, 108.

In the illustrative embodiment, the first outlet 106 threadably receives a first compression fitting 112 configured to threadably couple to a first compression ring or nut 114. In other embodiments, the first compression fitting 112 may be coupled to the first outlet 106 in other ways, including adhesive, a mechanical fastener, interference fit, or other coupling mechanisms. Similarly, the first compression nut 114 may be coupled to the first compression fitting 112 in another manner, including the mechanisms described above. A seal 116 may be positioned between the first compression fitting 112 and the first compression nut 114 to prevent undesired leaks. Illustratively, the first compression fitting 112, the compression nut 114 and the seal 116 may define a fluid coupling 118 to fluidly couple with a conventional fluid tube (not shown).

Illustratively, the second outlet 108 threadably receives a second compression fitting 120 configured to threadably couple to a second compression ring or nut 122. In other embodiments, the second compression fitting 120 may be coupled to the second outlet 108 in other ways, including adhesive, a mechanical fastener, interference fit, or other coupling mechanisms. Similarly, the second compression nut 122 may be coupled to the second compression fitting 120 in another manner, including the mechanisms described above. A seal 124 may be positioned between the second compression fitting 120 and the second compression nut 122 to prevent undesired leaks. Illustratively, the second compression fitting 120, the compression nut 122 and the seal 124 may define a fluid coupling 126 to fluidly couple with a conventional fluid tube (not shown).

The inlet 104 is defined by a cylindrical extension 127 of the valve body 102 which is configured to threadably couple to an inlet compression ring or nut 128. In other illustrative embodiments, the inlet compression nut 128 may be coupled to the valve body 102 at the inlet 104 in other ways, including adhesive, a mechanical fastener, interference fit, or other coupling mechanisms. A seal 130 may be positioned between the inlet 104 and the inlet compression nut 128 to prevent leaks. Illustratively, the inlet 104, the compression nut 128 and the seal 130 may define a fluid coupling 132.

Figure 3:
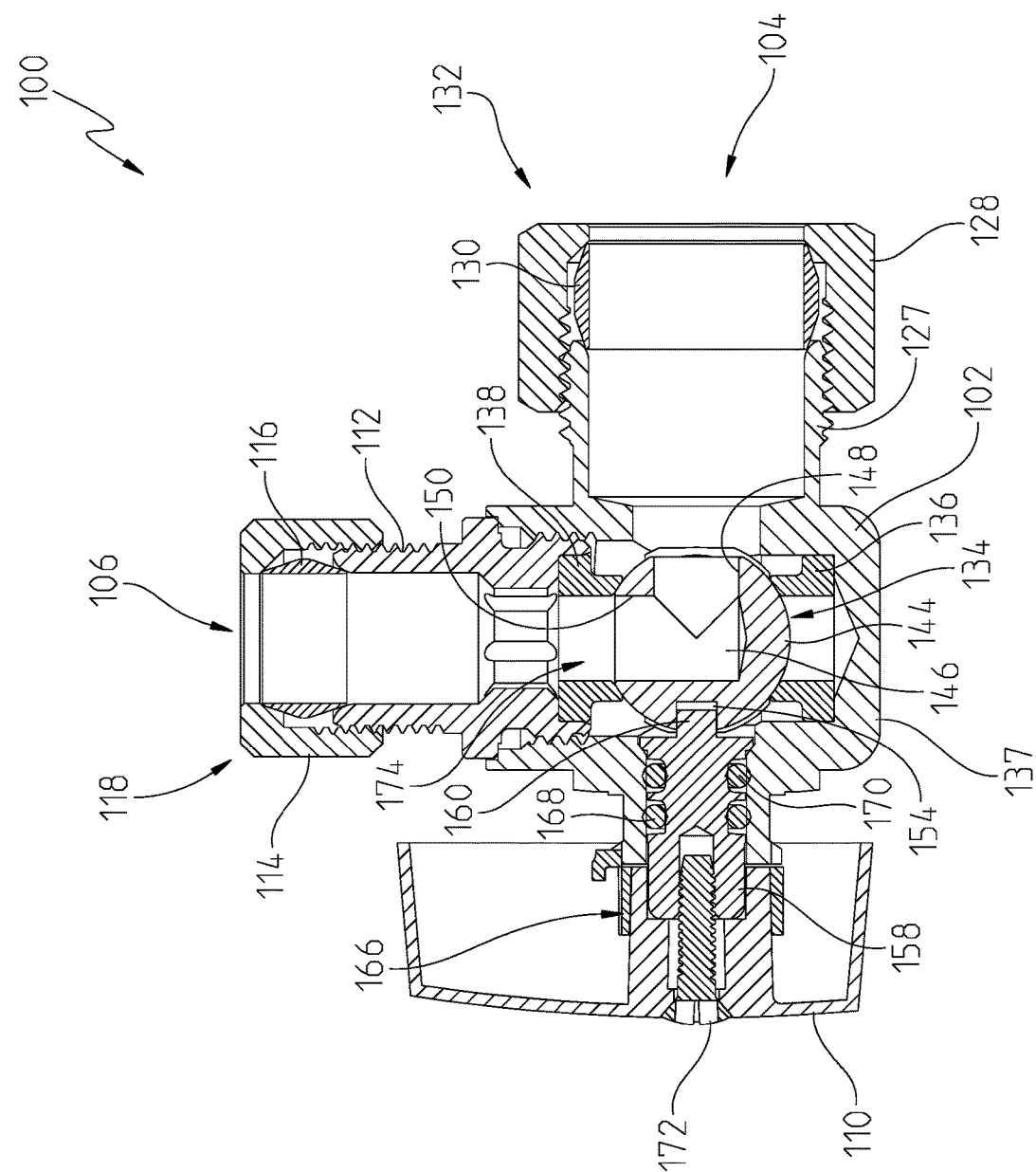
FIG. 3 is a cross-sectional view of the exemplary valve assembly of FIG. 1, taken along line 3-3 of FIG. 1.
Figure 4:
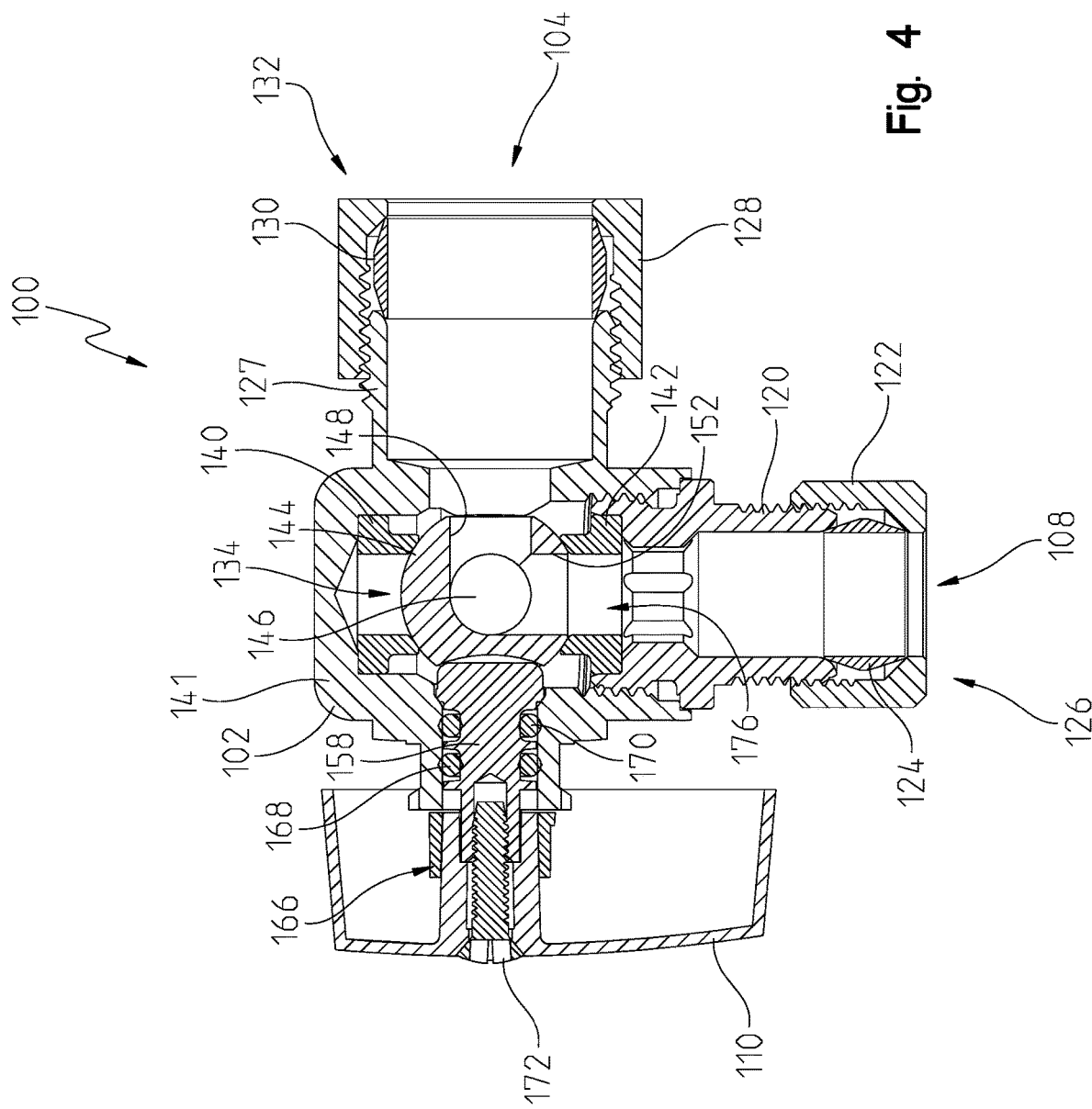
FIG. 4 is another cross-sectional view of the exemplary valve assembly of FIG. 1, taken along line 4-4 of FIG. 1.

Referring further to FIGS. 2-4, an exploded perspective view of the valve assembly 100 illustrates that a valve member, such as a valve ball 134, is movably supported within the valve body 102. A plurality of seats 136, 138, 140 and 142 are received within the valve body 102 and support the valve ball 134. More particularly, a first seat 136 is positioned within the valve body 102 opposite the first outlet 106 adjacent a closed end wall 137, and engages with the valve ball 134. A second seat 138 is positioned on the opposite side of the valve ball 134 from the first seat 136 and engages with the valve ball 134. The first compression fitting 112 is received in the first outlet 106 so that the first compression fitting 112 is positioned on the opposite side of the first seat 136 from the valve ball 134. As discussed above, the first compression fitting 112 is configured to threadably couple to the valve body 102 and the first compression nut 114.

A third seat 140 is positioned within the valve body 102 opposite the second outlet 108 adjacent a closed end wall 141, and engages the valve ball 134. The third seat 140 is illustratively positioned between the first seat 136 and the second seat 138 in a substantially orthogonal manner. A fourth seat 142 is positioned on the opposite side of the valve ball 134 from the third seat 140. The second compression fitting 120 is received in the second outlet 108 so that the second compression fitting 120 is positioned on the opposite side of the fourth seat 142 from the valve ball 134. As discussed above, the second compression fitting 120 is configured to threadably couple to the valve body 102 and the second compression nut 122.

Illustratively, the first seat 136, the second seat 138, the third seat 140, and the fourth seat 142 are formed of a resilient polymer, such as polytetrafluoroethylene, to prevent leaks between the valve ball 134 and the valve body 102. Other known materials may be used, such as other polymers and/or elastomers that would facilitate a leak-free seat that still allows smooth movement of the valve ball 134, as discussed further herein.

As detailed above, the valve ball 134 sits within the valve body 102 between the first seat 136, the second seat 138, the third seat 140, and the fourth seat 142. The valve ball 134 includes a spherical body 144 defining an internal chamber 146. The valve ball 134 further includes an inlet aperture 148, a first outlet aperture 150 and a second outlet aperture 152 in fluid communication with the internal chamber 146. A groove 154 is formed within an outer surface 156 of the spherical body 144. The first outlet aperture 150 and the second outlet aperture 152 are configured to be in selective fluid communication with either the first outlet 106 or the second outlet 108. The inlet aperture 148 is configured to be in fluid communication with the inlet 104. The groove 154 is configured to cooperate with the handle 110 as described further herein.

A valve stem 158 may be supported by the valve body 102 to cooperate with the handle 110. The valve stem 158 illustratively includes a key or tab 160 that may be received by the groove 154 of the valve ball 134 when assembled. An end portion or head 162 of the valve stem 158 extends through a handle hub 164 of the valve body 102 and into the handle 110 so that the handle 110 may manipulate the valve ball 134 within the valve body 102 via the valve stem 158. The coupling of the valve stem 158, the handle 110, and the handle hub 164 of the valve body 102 is facilitated by a handle insert 166. The valve stem 158 may include seals 168 and/or 170 to increase friction between the valve stem 158 and the handle hub 164 to facilitate smooth, deliberate movement of the valve stem 158 via the handle 110. Illustratively, the seals 168 and 170 are resilient o-rings. The handle 110 may be secured to the valve stem 158 via a fastener 172.

Referring now to FIG. 3, a cross-sectional view of the valve assembly 100 is shown, taken along line 3-3 of FIG. 1. In the configuration illustrated in FIGS. 3 and 7C, the first outlet aperture 150 of the valve ball 134 is in fluid communication with the first outlet 106, and the inlet aperture 148 is in fluid communication with the inlet 104. At least the second seat 138 includes a through-hole 174 that allows fluid to flow from the valve ball 134 to the first outlet 106. In such a configuration, fluid may flow from the inlet 104 to the first outlet 106. If a user manipulates the handle 110 in a certain manner, the valve ball 134 may rotate so that the first outlet aperture 150 of the valve ball 134 is no longer in communication with the first outlet 106, preventing fluid from flowing between the inlet 104 and the first outlet 106.

FIG. 4 shows a cross-sectional view of the valve assembly 100, taken along line 4-4 of FIG. 1. In the configuration illustrated in FIGS. 4 and 7C, the second outlet aperture 152 of the valve ball 134 is in fluid communication with the second outlet 108, and the inlet aperture 148 is in fluid communication with the inlet 104. At least the fourth seat 142 includes through-hole 176 that allows fluid to flow from the valve ball 134 to the second outlet 108. In such a configuration, fluid may flow from the inlet 104 to the second outlet 108. If a user manipulates the handle 110 in a certain manner, the valve ball 134 may rotate so that the second outlet aperture 152 of the valve ball 134 is no longer in communication with the second outlet 108, preventing fluid from flowing between the inlet 104 and the second outlet 108.

Figure 5:
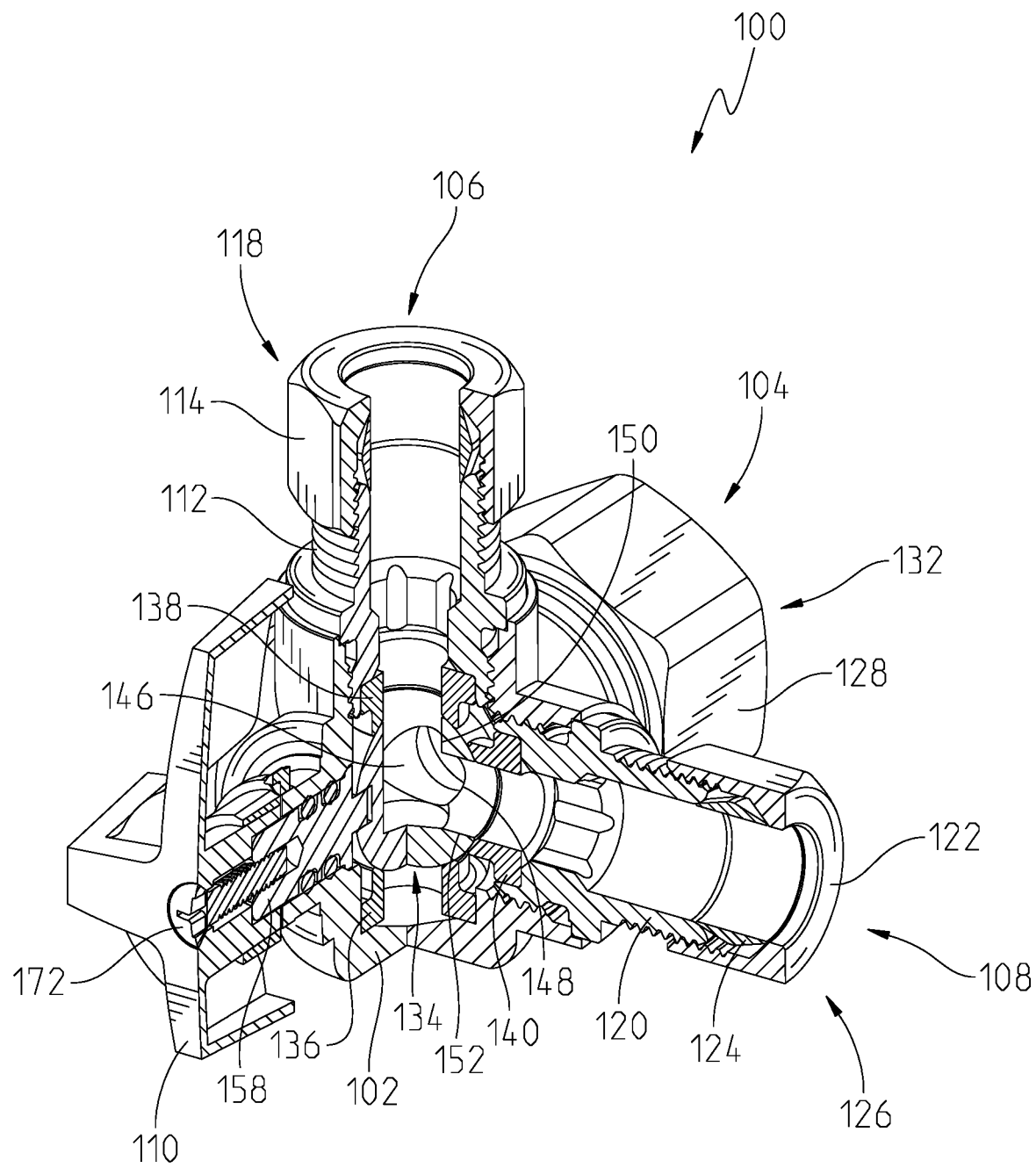
FIG. 5 is a perspective view of the exemplary valve assembly of FIG. 1, including a partial cut-away.

Now referring to FIG. 5, a perspective view of the valve assembly 100 is shown, wherein a portion of the valve assembly 100 is cut away at orthogonal planes. In the configuration illustrated in FIGS. 5 and 7C, the first outlet aperture 150 of the valve ball 134 is in fluid communication with the first outlet 106, the second outlet aperture 152 of the valve ball 134 is in fluid communication with the second outlet 108, and the inlet aperture 148 is in fluid communication with the inlet 104. In such a configuration, fluid may flow from the inlet 104 to the first outlet 106 and the second outlet 108 simultaneously. If a user manipulates the handle 110 in a certain manner (FIG. 7D), the valve ball 134 may rotate so that the first outlet aperture 150 of the valve ball 134 is in communication with the second outlet 108 and no longer in communication with the first outlet 106. Simultaneously, the second outlet aperture 152 of the valve ball 134 faces into the first seat 136 (FIG. 2), wherein the end wall 137 of the valve body 102 prevents fluid from flowing between the inlet 104 and the first outlet 106, but continuing to allow fluid to flow from the inlet 104 to the second outlet 108.

In another illustrative embodiment, if a user manipulates the handle 110 in a certain manner (FIG. 7A), the valve ball 134 may rotate so that the second outlet aperture 152 of the valve ball 134 faces the third seat 140 and the first outlet aperture 150 of the valve ball 134 faces the first seat 136 (FIG. 2), wherein the end walls 137 and 141 prevent fluid from flowing between the inlet 104 and the second outlet 108 and between the inlet 104 and the first outlet 106. In another illustrative embodiment, a user may manipulate the handle 110 in a certain manner (FIG. 7B) to rotate the valve ball 134 so that the second outlet aperture 152 of the valve ball 134 is in fluid communication with the first outlet 106 and the first outlet aperture 150 faces into the third seat 140 (FIG. 2). In such a configuration, fluid may flow from the inlet 104 to the first outlet 106, but may not flow from the inlet 104 to the second outlet 108 due to end wall 141. Because the first seat 136, the second seat 138, the third seat 140, and the fourth seat 142 (FIG. 2) are formed of a fluid-tight material, fluid does not escape between the first outlet aperture 148 or the second outlet aperture 150 and the valve ball 134 when facing into any respective seat 136, 138, 140, 142.

Figure 6:
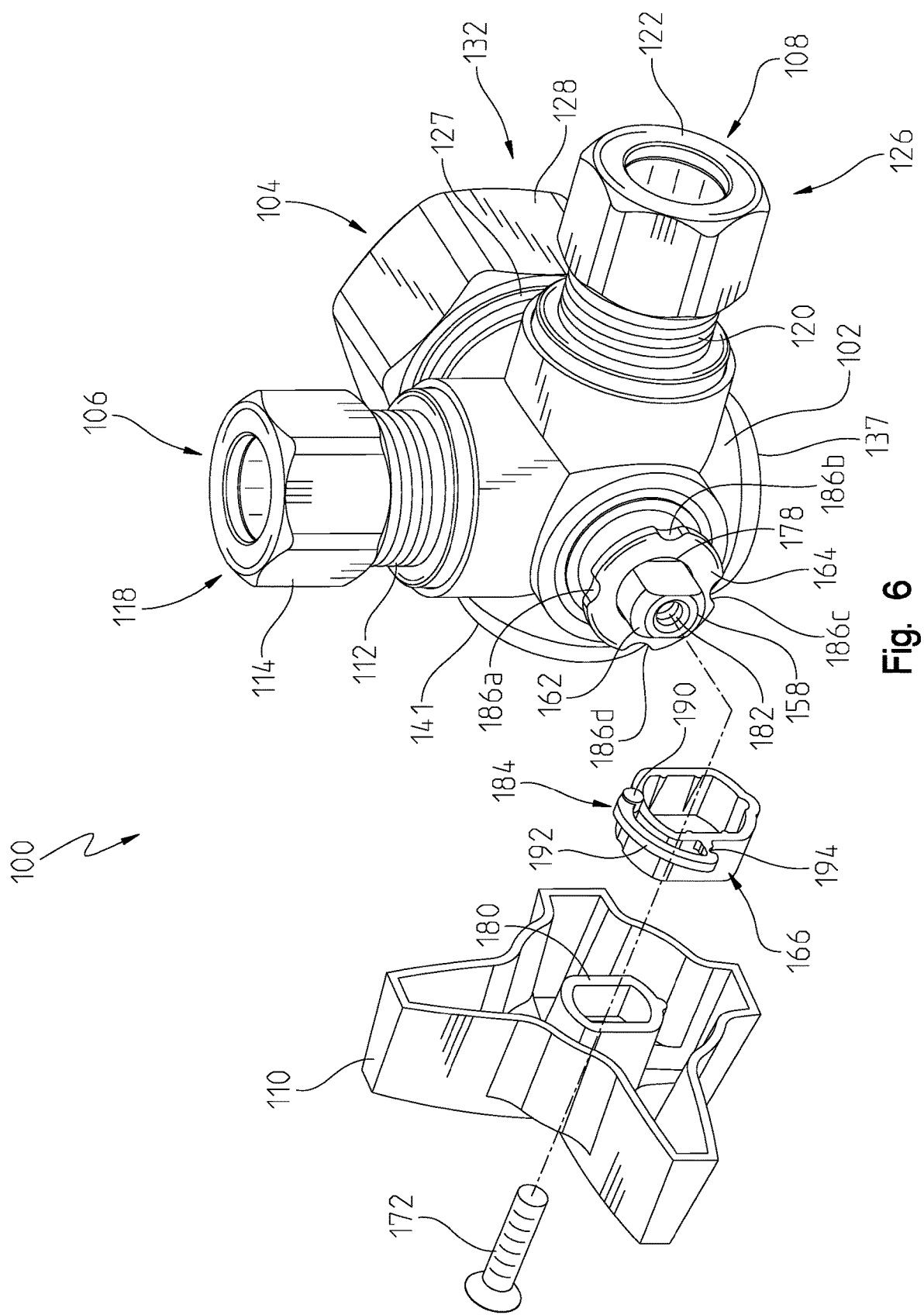
FIG. 6 is a partially exploded perspective view of the exemplary valve assembly of FIG. 1, showing the coupling of the handle with the valve body via a valve stem.

Now referring to FIG. 6, the coupling between the handle 110 and the valve body 102 is illustrated. As discussed above, the coupling of the valve stem 158, the handle 110, and the handle hub 164 of the valve body 102 is facilitated by the handle insert 166. The handle hub 164 includes a through-hole 178 sized to receive the valve stem 158 so that the head 162 of the valve stem 158 extends from the handle hub 164 to be received by a receiver 180 of the handle 110, so that when the handle 110 is manipulated by a user, the valve stem 158 is also manipulated. As discussed above, the key 160 of the valve stem 158 extends into the groove 154 of the valve ball 134 (FIGS. 2-5) so that when the handle 110 is manipulated by a user, the valve ball 134 is also manipulated via the valve stem 158. The head 162 of the valve stem 158 may further define a bore 182 configured to receive the fastener 172 to facilitate the coupling between the handle 110 and the valve stem 158.

The handle insert 166 is configured to form an interference fit around the receiver 180 of the handle 110. In other embodiments, the handle insert 166 may couple with the handle 110 in other ways, including adhesive and fasteners. The handle insert 166 illustratively includes an indexing member 184 to variably mate with the handle hub 164. The handle hub 164 illustratively includes four notches 186a-186d circumferentially spaced around a perimeter 188 of the handle hub 164, wherein each notch 186 corresponds with a configuration or position of the valve ball 134 (FIGS. 7A-7D) within the valve body 102. The indexing member 184 includes a pin 190 supported by a resilient arm 192. The resilient arm 192 illustratively includes a living hinge 194. The pin 190 selectively rests within each notch 186a-186d for each configuration of the valve ball 134 (FIGS. 2-5).

For example, referring to both FIGS. 5 and 6, when the pin 190 matches with the notch 186a, the first outlet aperture 150 of the valve ball 134 is in fluid communication with the first outlet 106 and the second outlet aperture 152 of the valve ball 134 is in fluid communication with the second outlet 108. When the pin 190 matches with the notch 186*b*, the first outlet aperture 150 of the valve ball 134 is in fluid communication with the second outlet 108 and the second outlet aperture 152 of the valve ball 134 faces into the first seat 136. When the pin 190 matches with the notch 186*c*, the first outlet aperture 148 of the valve ball 134 faces into the first seat 136 and the second outlet aperture 152 faces into the third seat 140 (FIG. 2). When the pin 190 matches with the notch 186*d*, the first outlet aperture 150 of the valve ball 134 faces into the third seat 140 (FIG. 2) and the second outlet aperture 152 of the valve ball 134 is in fluid communication with the first outlet 106. Other combinations may be imagined for corresponding the position of the ball with the notches 184*a*-184*d*. Because the first seat 136, the second seat 138, the third seat 140 (FIG. 2), and the fourth seat 142 are comprised of a fluid-tight material, fluid does not escape the first outlet aperture 148 or the second outlet aperture 152 when facing into any respective seat.

Figures 7A, 7B:
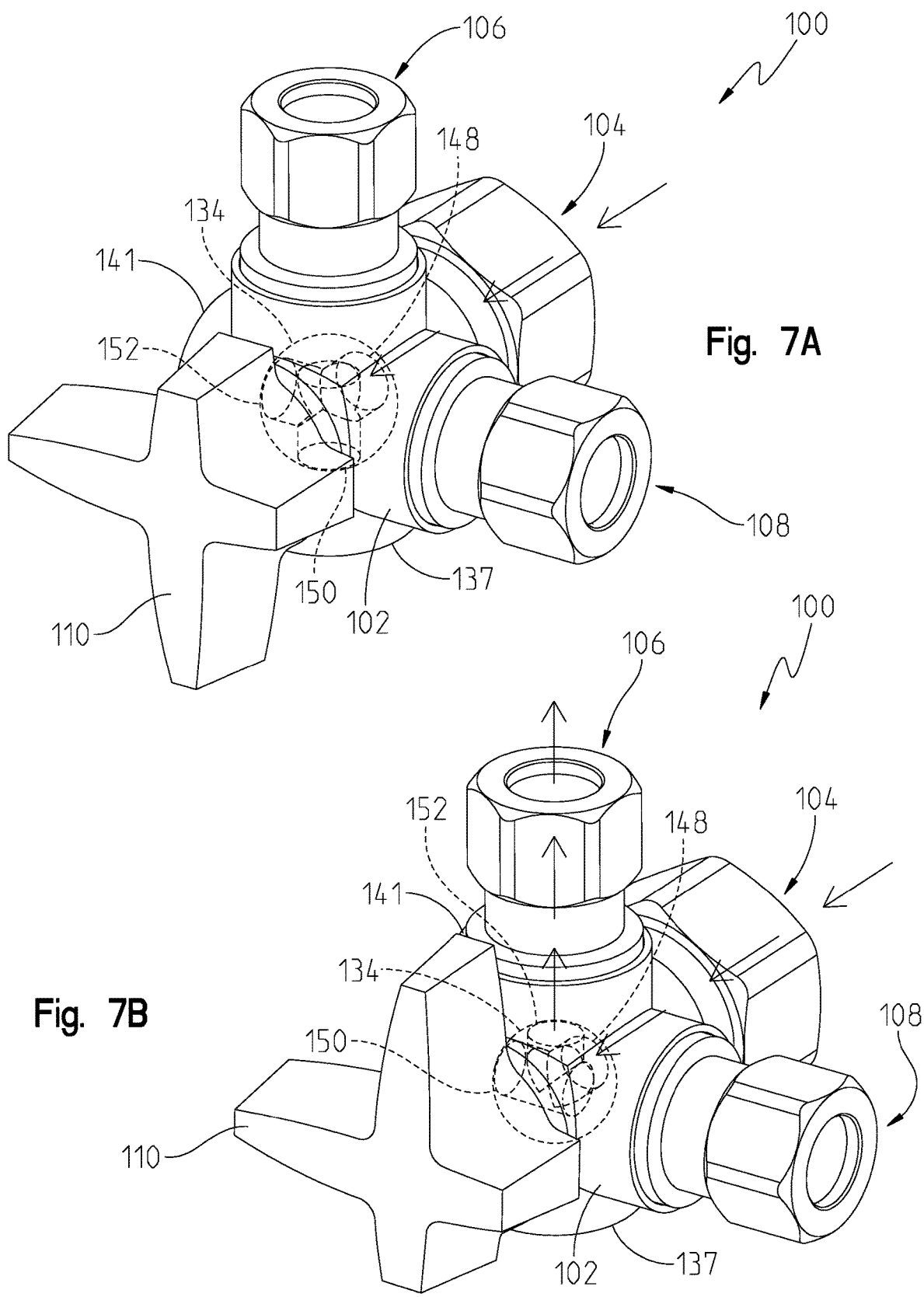
FIG. 7A is a perspective view showing the valve ball in a first or closed configuration where no water flows through either the first outlet or the second outlet.
FIG. 7B is a perspective view showing the valve ball in a second configuration where water flows through the first outlet but not through the second outlet.

FIGS. 7A-7D show the valve ball 134 in different operating positions or configurations as a result of rotation of the handle 110 by a user. FIG. 7A is a perspective view showing the valve ball 134 in a first or closed configuration where no water flows from the inlet 104 through either the first outlet 106 or the second outlet 108 of the valve body 102. Illustratively, the inlet aperture 148 of the valve ball 134 is in fluid communication with the inlet 104 of the valve body 102. Simultaneously, the first outlet aperture 150 and the second outlet aperture 152 of the valve ball 134 are blocked by seats 136, 140 and end walls 137, 141, respectively, from fluid communication with the first outlet 106 and the second outlet 108 of the valve body 102.

FIG. 7B is a perspective view showing the valve ball 134 in a second configuration where the handle 110 has been rotated clockwise by 90 degrees from the configuration of FIG. 7A, and water flows from the inlet 104 through the first outlet 106 but not through the second outlet 108. Illustratively, the inlet aperture 148 of the valve ball 134 remains in fluid communication with the inlet 104 of the valve body 102. Simultaneously, the second outlet aperture 152 of the valve ball 134 is in fluid communication with the first outlet 106 of the valve body 102, and the first outlet aperture 150 of the valve ball 134 is blocked by seat 140 and end wall 141 from fluid communication with the first outlet 106 and the second outlet 108 of the valve body 102.

Figure 7C:
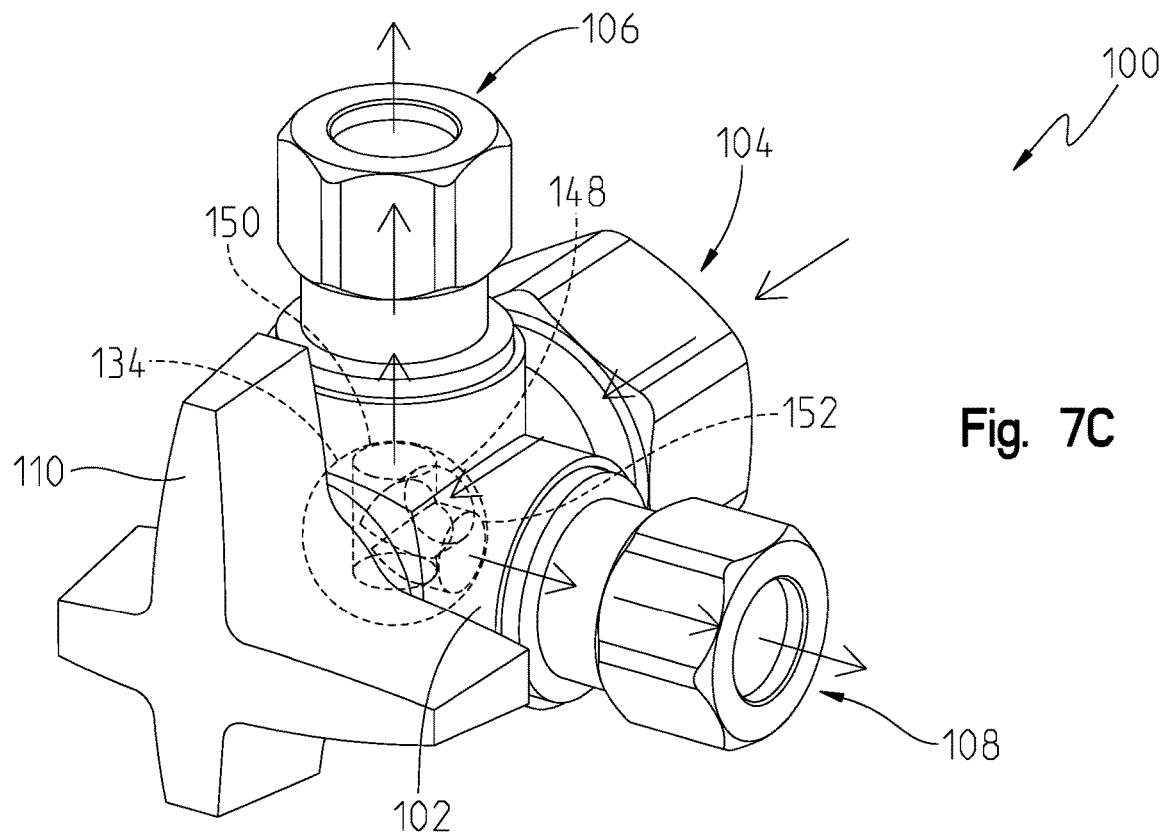
FIG. 7C is a perspective view showing the valve ball in a third configuration where water flows through both the first outlet and the second outlet.

FIG. 7C is a perspective view showing the valve ball 134 in a third configuration where the handle 110 has been rotated clockwise by 90 degrees from the configuration of FIG. 7B, and water flows from the inlet 104 through both the first outlet 106 and the second outlet 108. Illustratively, the inlet aperture 148 of the valve ball 134 remains in fluid communication with the inlet 104 of the valve body 102. Simultaneously, the first outlet aperture 150 of the valve ball 134 is in fluid communication with the first outlet 106 of the valve body 102, and the second outlet aperture 152 of the valve member 134 is in fluid communication with the second outlet 108 of the valve body 102.

Figure 7D:
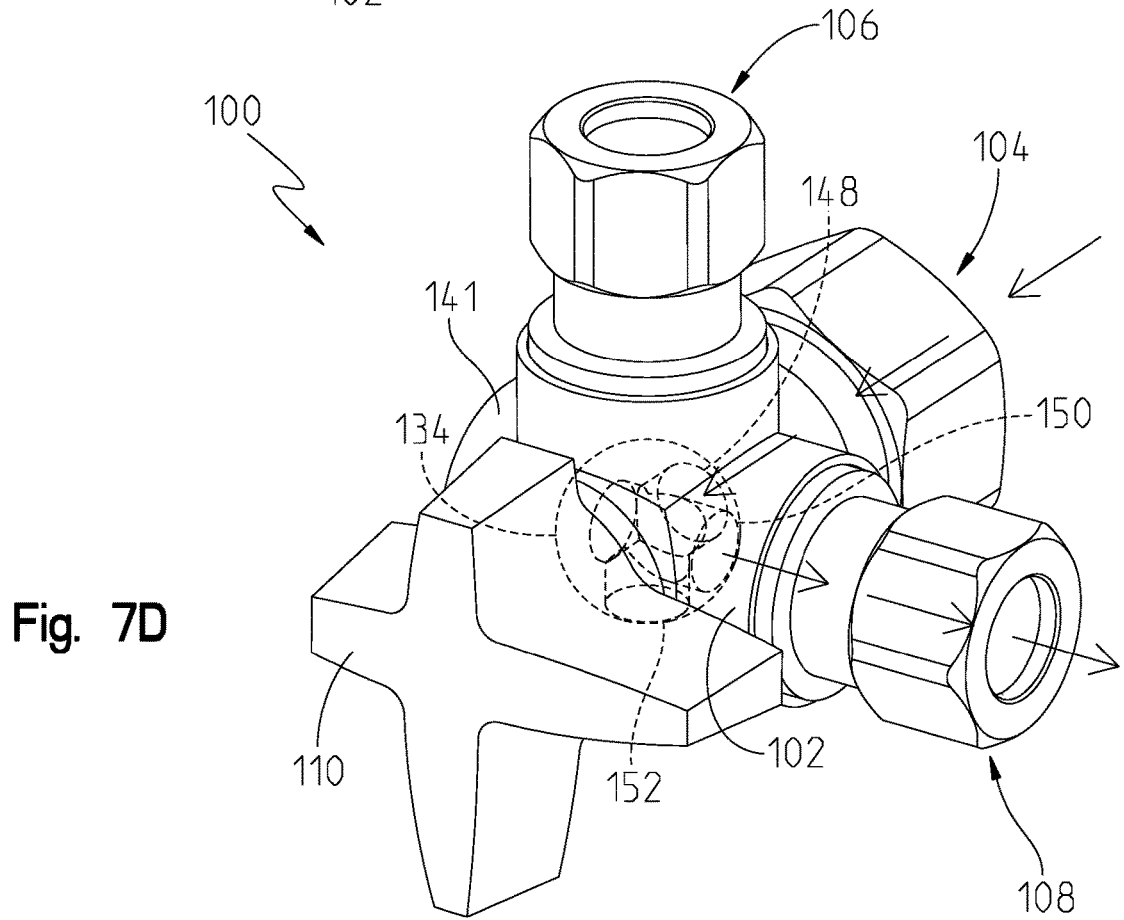
FIG. 7D is a perspective view showing the valve ball in a fourth configuration where water flows through the second outlet but not through the first outlet.

FIG. 7D is a perspective view showing the valve ball 134 in a fourth configuration where the handle 110 has been rotated clockwise by 90 degrees from the configuration of FIG. 7C, and water flows from the inlet 104 through the second outlet 108 but not through the first outlet 106 of the valve body 102. Illustratively, the inlet aperture 148 of the valve ball 134 remains in fluid communication with the inlet 104 of the valve body 102. Simultaneously, the second outlet aperture 152 of the valve ball 134 is blocked by seat 136 and end wall 137 from fluid communication with the first outlet 106 and the second outlet 108 of the valve body 102, and the first outlet aperture 150 is in fluid communication with the second outlet 108 of the valve body 102.

As used in this patent application, the terminology "for example," "for instance," "like," "such as," "comprising," "having," "including," and the like, when used with a listing of one or more elements, is open-ended, meaning that the listing does not exclude additional elements. Likewise, when preceding an element, the articles "a," "an," "the," and "said" mean that there are one or more of the elements. Moreover, directional words such as front, rear, top, bottom, upper, lower, radial, circumferential, axial, lateral, longitudinal, vertical, horizontal, transverse, and/or the like are employed by way of example and not limitation. As used herein, the term "may" is an expedient merely to indicate optionality, for instance, of an element, feature, or other thing, and cannot be reasonably construed as rendering indefinite any disclosure herein. Other terms are to be interpreted and construed in the broadest reasonable manner in accordance with their ordinary and customary meaning in the art, unless the terms are used in a context that requires a different interpretation.

Finally, the present disclosure is not a definitive presentation of an invention claimed in this patent application but is merely a presentation of examples of illustrative embodiments of the claimed invention. More specifically, the present disclosure sets forth one or more examples that are not limitations on the scope of the claimed invention or on terminology used in the accompanying claims, except where terminology is expressly defined herein. And although the present disclosure sets forth a limited number of examples, many other examples may exist now or are yet to be discovered and, thus, it is neither intended nor possible to disclose all possible manifestations of the claimed invention. In fact, various equivalents will become apparent to artisans of ordinary skill in view of the present disclosure and will fall within the spirit and broad scope of the accompanying claims. Features of various implementing embodiments may be combined to form further embodiments of the invention. Therefore, the claimed invention is not limited to the particular examples of illustrative embodiments disclosed herein but, instead, is defined by the accompanying claims.

The invention claimed is:

1. A valve assembly comprising:
a valve body including an inlet, a first outlet, and a second outlet;
a handle supported by the valve body;
a valve member positioned within the valve body and coupled to the handle, the valve member including a valve ball having an inlet aperture in fluid communication with the inlet of the valve body and at least one outlet aperture in selective communication with at least one of the first outlet and the second outlet of the valve body;
a first seat positioned within the valve body opposite the first outlet adjacent a first closed end wall and engaging the valve ball;
a second seat positioned within the valve body on the opposite side of the valve ball from the first seat and engaging the valve ball;
a first compression fitting received in the first outlet and positioned on the opposite side of the valve ball from the first seat, the second seat positioned intermediate the first compression fitting and the valve ball;
a third seat positioned within the valve body opposite the second outlet adjacent a second closed end wall and engaging the valve ball;

a fourth seat positioned within the valve body on the opposite side of the valve ball from the third seat and engaging the valve ball;

a second compression fitting received in the second outlet and positioned on the opposite side of the valve ball from the fourth seat, the fourth seat positioned intermediate the second compression fitting and the valve ball; and a valve stem operably coupled to the handle and the valve member;

wherein the valve body further includes a handle hub having an aperture for receiving the valve stem and a plurality of circumferentially spaced notches, and the handle includes a receiver to receive an end portion of the handle stem and a handle insert configured to couple with the receiver, the handle insert including an indexing member configured to selectively engage with each of the plurality of circumferentially spaced notches.

2. The valve assembly of claim 1, wherein the first seat and the second seat are comprised of polytetrafluoroethylene.

3. The valve assembly of claim 1, wherein the valve stem includes a key configured to be received within a groove of the ball.

4. The valve assembly of claim 1, wherein rotation of the handle rotates the valve member between a plurality of configurations.

5. The valve assembly of claim 1, the at least one outlet aperture of the valve ball including a first outlet aperture and a second outlet aperture, each in selective communication with the first outlet and the second outlet of the valve body.

6. The valve assembly of claim 5, the valve ball selectively defining at least four configurations:
a first configuration in which the inlet of the valve body is blocked from fluid communication with the first outlet and the second outlet of the valve body;
a second configuration in which the inlet of the valve body is in fluid communication with the first outlet of the valve body, and the inlet of the valve body is blocked from fluid communication with the second outlet of the valve body;
a third configuration in which the inlet of the valve body is in fluid communication with both the first outlet and the second outlet of the valve body; and
a fourth configuration in which the inlet of the valve body is blocked from fluid communication with the first outlet of the valve body, and the inlet is in fluid communication with the second outlet of the valve body.

7. The valve assembly of claim 1, wherein the handle insert includes a resilient arm supporting the indexing member.

8. The valve assembly of claim 7, wherein the resilient arm includes a living hinge, and the indexing member includes a pin selectively received within one of the notches.

9. A valve assembly comprising:
a valve body including an inlet, a first outlet, and a second outlet;
a handle rotatably coupled to the valve body; and
a valve ball positioned within the valve body and coupled to the handle, the valve ball including an inlet aperture in fluid communication with the inlet of the valve body, a first outlet aperture in selective communication with the first outlet and the second outlet of the valve body, and a second outlet aperture in selective communication with the first outlet and the second outlet of the valve body;

the valve ball selectively defining a plurality of configurations including:
a first configuration in which the first outlet aperture and the second outlet aperture are blocked from fluid communication with the first outlet and the second outlet of the valve body;
a second configuration in which the second outlet aperture is in fluid communication with the first outlet of the valve body, and the first outlet aperture is blocked from fluid communication with the first outlet and the second outlet of the valve body;
a third configuration in which the first outlet aperture is in fluid communication with the first outlet of the valve body, and the second outlet aperture is in fluid communication with the second outlet of the valve body; and
a fourth configuration in which the second outlet aperture is blocked from fluid communication with the first outlet and the second outlet of the valve body, and the first outlet aperture is in fluid communication with the second outlet of the valve body;
a first seat positioned within the valve body opposite the first outlet adjacent a first closed end wall, the first seat formed of a polymer and engaging the valve ball;
a second seat positioned within the valve body on the opposite side of the valve ball from the first seat, the second seat formed of a polymer and engaging the valve ball;
a first compression fitting received in the first outlet and positioned on the opposite side of the valve ball from the first seat, the second seat positioned intermediate the first compression fitting and the valve ball;
a third seat positioned within the valve body opposite the second outlet adjacent a second closed end wall, the third seat formed of a polymer and engaging the valve ball;
a fourth seat positioned within the valve body on the opposite of the valve ball from the third seat, the fourth seat formed of a polymer and engaging the valve ball; and
a second compression fitting received in the second outlet and positioned on the opposite side of the valve ball from the fourth seat, the fourth seat positioned intermediate the second compression fitting and the valve ball.

10. The valve assembly of claim 9, the valve body further including a handle hub having an aperture for receiving a handle stem and a plurality of notches and the handle including a coupling key to receive a top portion of the handle stem and a handle insert configured to couple with the coupling key, the handle insert including an indexing member configured to selectively match with each of the plurality of notches.

11. The valve assembly of claim 10, wherein the handle insert includes a resilient arm supporting the indexing member.

12. The valve assembly of claim 10, wherein each notch corresponds to a different configuration of the ball.

13. The valve assembly of claim 9, wherein rotation of the handle corresponds with rotation of the ball between configurations.

14. A valve assembly comprising:
a valve body including an inlet, a first outlet, a second outlet, and a handle hub having an aperture and a plurality of notches;
a valve member positioned within the valve body, the valve member including an inlet aperture in fluid communication with the inlet of the valve body and at least one outlet aperture in selective communication with at least one of the first outlet and the second outlet of the valve body;
a valve stem operably coupled to the valve member; and
a handle operably coupled to the valve stem, the handle including a receiver to receive an end portion of the valve stem and a handle insert configured to couple with the receiver, the handle insert including a resilient arm supporting an indexing member configured to selectively match with each of the plurality of notches, the plurality of notches including a first notch, a second notch, a third notch and a fourth notch;
the resilient arm including a living hinge, and the indexing member including a pin selectively received within one of the notches;
the valve member selectively includes four operable configurations including:
a first configuration in which the inlet is blocked from fluid communication with the first outlet and the second outlet when the indexing member engages with the first notch;
a second configuration in which the inlet is in fluid communication with the first outlet and the inlet is blocked from fluid communication with the second outlet when the indexing member engages with the second notch;
a third configuration in which the inlet is in fluid communication with both the first outlet and the second outlet when the indexing member engages with the third notch; and
a fourth configuration in which the inlet is blocked from fluid communication with the first outlet, and the inlet is in fluid communication with the second outlet when the indexing member engages with the fourth notch;
a first seat positioned within the valve body opposite the first outlet adjacent a first closed end wall, the first seat formed of a polymer and engaging the valve member;
a second seat positioned within the valve body on the opposite side of the valve member from the first seat, the second seat formed of a polymer and engaging the valve member;
a first compression fitting received in the first outlet and positioned on the opposite side of the valve member from the first seat, the second seat positioned intermediate the first compression fitting and the valve member;
a third seat positioned within the valve body opposite the second outlet adjacent a second closed end wall, the third seat formed of a polymer and engaging the valve member;
a fourth seat positioned within the valve body on the opposite of the valve member from the third seat, the fourth seat formed of a polymer and engaging the valve member; and
a second compression fitting received in the second outlet and positioned on the opposite side of the valve member from the fourth seat, the fourth seat positioned intermediate the second compression fitting and the valve member.

15. The valve assembly of claim 14, wherein the valve member comprises a valve ball, the valve ball including the at least one outlet aperture, the at least one outlet aperture including a first outlet aperture and a second outlet aperture, each in selective communication with the first outlet and the second outlet of the valve body.

16. The valve assembly of claim 15, wherein:
in the first configuration, the first outlet aperture and the second outlet aperture are blocked from fluid communication with the first outlet and the second outlet of the valve body;
in the second configuration, the second outlet aperture is in fluid communication with the first outlet of the valve body, and the first outlet aperture is blocked from fluid communication with the first outlet and the second outlet of the valve body;
in the third configuration, the first outlet aperture is in fluid communication with the first outlet of the valve body, and the second outlet aperture is in fluid communication with the second outlet of the valve body; and
in the fourth configuration, the second outlet aperture is blocked from fluid communication with the first outlet and the second outlet of the valve body, and the first outlet aperture is in fluid communication with the second outlet of the valve body.

17. The valve assembly of claim 15, wherein the valve stem includes a key configured to be received within a groove of the valve ball.

18. The valve assembly of claim 14, wherein rotation of the handle corresponds with rotation of the valve member between configurations.

* * * * *